United States Patent
Kim et al.

(10) Patent No.: US 10,556,404 B2
(45) Date of Patent: Feb. 11, 2020

(54) COMPOSITION FOR NON-ORIENTED ELECTRICAL STEEL SHEET, METHOD OF MANUFACTURING NON-ORIENTED ELECTRICAL STEEL SHEET PRODUCT, AND NON-ORIENTED ELECTRICAL STEEL SHEET PRODUCT

(71) Applicant: POSCO, Pohang-si, Gyeongsangbuk-do (KR)

(72) Inventors: Jung Woo Kim, Pohang-si (KR); Heon-Jo Choi, Pohang-si (KR); Byung-Chul Kim, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 248 days.

(21) Appl. No.: 15/100,021

(22) PCT Filed: Nov. 26, 2014

(86) PCT No.: PCT/KR2014/011419
§ 371 (c)(1),
(2) Date: May 27, 2016

(87) PCT Pub. No.: WO2015/080463
PCT Pub. Date: Jun. 4, 2015

(65) Prior Publication Data
US 2016/0375658 A1    Dec. 29, 2016

(30) Foreign Application Priority Data
Nov. 27, 2013    (KR) .................. 10-2013-0145660

(51) Int. Cl.
*B32B 15/18*    (2006.01)
*C09D 163/00*    (2006.01)
(Continued)

(52) U.S. Cl.
CPC ............... *B32B 15/18* (2013.01); *B32B 7/12* (2013.01); *B32B 15/043* (2013.01);
(Continued)

(58) Field of Classification Search
CPC ..... B32B 15/043; B32B 15/092; B32B 37/06; B32B 37/1284; B32B 37/18; B32B 7/12;
(Continued)

(56) References Cited

U.S. PATENT DOCUMENTS

| | | | | |
|---|---|---|---|---|
| 4,609,686 A | * | 9/1986 | Giordano, Jr. | ......... C08F 283/10 522/31 |
| 2005/0003199 A1 | * | 1/2005 | Takaya | .................... B32B 15/08 428/413 |

(Continued)

FOREIGN PATENT DOCUMENTS

| | | |
|---|---|---|
| CN | 1667056 A | 9/2005 |
| CN | 101040022 A | 9/2007 |

(Continued)

OTHER PUBLICATIONS

DIC Corporation, Epiclon Standard Products Epoxy Resins and Curing Agents (Mar. 2013).*

*Primary Examiner* — Kregg T Brooks
(74) *Attorney, Agent, or Firm* — Morgan, Lewis & Bockius LLP (57) ABSTRACT

A non-oriented electrical steel sheet composition, a manufacturing method of the non-oriented electrical steel sheet product, and a non-oriented electrical steel sheet product are provided, and the non-oriented electrical steel sheet composition includes a first composition including a soluble epoxy resin and an inorganic nanoparticle of $SiO_2$, $TiO_2$, ZnO, or combinations thereof, and an inorganic additive of phosphoric acid ($H_3PO_4$), sodium hydroxide (NaOH), or a (Continued)

combination thereof, wherein the inorganic nanoparticle is substituted in a terminal substituent group of the soluble epoxy resin, and the epoxy resin is a multifunctional epoxy resin in which there are three or more epoxy groups.

17 Claims, 2 Drawing Sheets

(51) Int. Cl.

| | | |
|---|---|---|
| *C09J 163/00* | (2006.01) | |
| *B32B 15/092* | (2006.01) | |
| *C08K 3/105* | (2018.01) | |
| *B32B 7/12* | (2006.01) | |
| *B32B 15/04* | (2006.01) | |
| *B32B 37/06* | (2006.01) | |
| *B32B 37/12* | (2006.01) | |
| *B32B 37/18* | (2006.01) | |
| *C08K 3/22* | (2006.01) | |
| *C08K 3/32* | (2006.01) | |
| *C08K 3/36* | (2006.01) | |

(52) U.S. Cl.
CPC ............ *B32B 15/092* (2013.01); *B32B 37/06* (2013.01); *B32B 37/1284* (2013.01); *B32B 37/18* (2013.01); *C08K 3/105* (2018.01); *C09D 163/00* (2013.01); *C09J 163/00* (2013.01); *B32B 2255/06* (2013.01); *B32B 2255/20* (2013.01); *B32B 2255/26* (2013.01); *B32B 2307/202* (2013.01); *B32B 2307/208* (2013.01); *B32B 2307/306* (2013.01); *B32B 2311/30* (2013.01); *B32B 2457/00* (2013.01); *B32B 2605/00* (2013.01); *C08K 3/22* (2013.01); *C08K 3/32* (2013.01); *C08K 3/36* (2013.01); *C08K 2003/2241* (2013.01); *C08K 2003/2296* (2013.01); *C08K 2003/329* (2013.01)

(58) Field of Classification Search
CPC . B32B 15/18; B32B 2255/06; B32B 2255/26; B32B 2307/202; B32B 2307/208; B32B 2311/30; C08L 63/00–10; C09D 163/00–10; C09J 163/00–10; C08J 2363/00–10; C08K 2003/329; C08K 3/105; C08K 2003/2241; C08K 2003/2296; C08K 3/22; C08K 3/36
See application file for complete search history.

(56) References Cited

U.S. PATENT DOCUMENTS

| | | | | |
|---|---|---|---|---|
| 2007/0087201 | A1* | 4/2007 | Wimmer | C08G 59/4021 428/413 |
| 2007/0231463 | A1* | 10/2007 | Huang | C08G 59/4021 427/58 |
| 2015/0017428 | A1* | 1/2015 | Kim | H01B 3/40 428/331 |

FOREIGN PATENT DOCUMENTS

| | | |
|---|---|---|
| JP | 07-201551 A | 8/1995 |
| JP | 11-50260 A | 2/1999 |
| JP | 11-193475 A | 7/1999 |
| JP | 2000-034580 A | 2/2000 |
| JP | 2001-220683 A | 8/2001 |
| JP | 2002-019016 A | 1/2002 |
| JP | 2011/012296 A | 1/2011 |
| KR | 10-2011-0072848 A | 6/2011 |
| KR | 10-2011-0076374 A | 7/2011 |
| KR | 10-2013-0076642 A | 7/2013 |
| WO | 2013/100354 A1 | 7/2013 |

OTHER PUBLICATIONS

Hongbo Gu et al: "An overview of multifunctional epoxy nanocomposites", Journal of Materials Chemistry C: Materials for Optical and Electronic Devices, vol. 4, No. 25, Jan. 1, 2016 (Jan. 1, 2016), pp. 5890-5906, XP055373071, UK ISSN: 2050-7526, DOI: 10.1039/C6TC01210H.

Office Action issued in corresponding Japanese Patent Application No. 2016-555436, dated May 16, 2017 with English Language translation.

Office Action issued in corresponding Chinese Patent Application No. 201480064814, dated Jul. 5, 2017 with English Language translation.

Extended European Search Report issued in corresponding European Patent Application No. 14865105.2, dated May 29, 2017.

International Search Report dated Jan. 7, 2015, issued in International Application No. PCT/KR2014/011419. (w/ English translation).

European Office Action dated Jun. 15, 2018 issued in European Patent Application No. 14865105.2.

Horbia—"A Guidebook to particle size analysis," Dec. 31, 2012, pp. 1-31.

* cited by examiner

COMPOSITION FOR NON-ORIENTED ELECTRICAL STEEL SHEET, METHOD OF MANUFACTURING NON-ORIENTED ELECTRICAL STEEL SHEET PRODUCT, AND NON-ORIENTED ELECTRICAL STEEL SHEET PRODUCT

CROSS-REFERENCE TO RELATED APPLICATION

This application is the U.S. National Phase under 35 U.S.C. § 371 of International Patent Application No. PCT/KR2014/011419, filed on Nov. 26, 2014, which in turn claims claims priority to and the benefit of Korean Patent Application No. 10-2013-0145660 filed in the Korean Intellectual Property Office on Nov. 27, 2013, the entire contents of which are incorporated herein by reference.

BACKGROUND OF THE INVENTION (a) Field of the Invention

The present invention relates to a non-oriented electrical steel sheet composition, a manufacturing method of a non-oriented electrical steel sheet product, and a non-oriented electrical steel sheet product.

(b) Description of the Related Art

A non-oriented electrical steel sheet is a steel sheet of which a magnetic property thereof is uniform in all directions on a rolling plate, and is widely used in a motor, an iron core of an electric generator, an electric motor, a small transformer, and the like.

The non-oriented electrical steel sheet may be divided into two types such as one in which stress-removing annealing (SRA) for improving the magnetic property after punching work should be practiced and the other in which the SRA is omitted if a cost loss is larger than the effect of the magnetic property by the SRA Also, the non-oriented electrical steel sheet is used in demanding markets of driving motors, home appliances, and large motors to be separated.

A forming of the insulating film is a procedure which belongs to a finishing process for manufacturing a product, and requires stickiness resistance such that steel sheets of iron cores are not adhered to each other after the SRA which recovers the magnetic property by removing the processing stress of the steel sheet and the continuous punching workability inhibiting abrasion of a mold, and surface adherence and the like, upon preparing iron cores by laminating many materials after the punching work in a predetermined shape, in addition to electrical properties inhibiting occurrence of an eddy current.

In addition to said basic characteristics, excellent application workability of a coating solution, solution stability usable for a long period after the combination, and the like are also required.

Meanwhile, a main purpose of a non-oriented insulating film resides in inter-layer insulation between iron sheets to be laminated. However, as the use of small electric motors is increased, film performance advantageous to workability, weldability, and corrosion resistance, as well as an insulating property, is evaluated as a major physical property, and recently an electrical steel sheet having excellent surface quality has been required as the surface quality of the steel sheet also has an effect on the use characteristics.

Also, the non-oriented electrical steel sheet is currently riding a wave of high-end usage by the development of high efficiency motors to keep pace with government's low-carbon policy, and as it proceeds to the high-end usage, the surface of the electrical sheet requires high functionality (high insulating property, high heat resistance, and high corrosion resistance).

In particular, an excellent insulating property between the layers of non-oriented electrical steel sheets, by which the performance of motor can be maximized by minimizing eddy current loss, is an essential factor. In order to secure an excellent insulating property for the non-oriented electrical steel sheet, the method of increasing a coating thickness thereof is the most common method. However, if the coating thickness is increased, there is a disadvantage that the properties such as weldability, heat resistance, adherence before/after SRA, stacking factor, and the like, are deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

A non-oriented electrical steel sheet composition having improved characteristics, a manufacturing method of a non-oriented electrical steel sheet product, and a non-oriented electrical steel sheet product are provided.

In an exemplary embodiment of the present invention, a non-oriented electrical steel sheet composition including a first composition including a soluble epoxy resin and an inorganic nanoparticle of $SiO_2$, $TiO_2$, ZnO, or combinations thereof; and an inorganic additive of phosphoric acid ($H_3PO_4$), sodium hydroxide (NaOH), or a combination thereof is provided, wherein the inorganic nanoparticle is substituted in a terminal substituent group of the soluble epoxy resin, and the epoxy resin is a multifunctional epoxy resin in which there are three or more epoxy groups.

The content of the inorganic nanoparticle in the first composition may be from 1 to 60 wt % for 100 wt % of the first composition.

The first composition may include a soluble epoxy resin and an inorganic nanoparticle of $SiO_2$, $TiO_2$, or ZnO, and the content of the inorganic nanoparticle may be from 1 to 40 wt % of $SiO_2$, from 5 to 30 wt % of $TiO_2$, or from 3 to 60 wt % of ZnO for 100 wt % of the first composition.

The first composition may include a soluble epoxy resin and an inorganic nanoparticle of $SiO_2$, $TiO_2$, or ZnO, and the particle size of the inorganic nanoparticle may be from 3 to 50 nm for $SiO_2$, from 20 to 100 nm for $TiO_2$, or from 30 to 100 nm for ZnO.

The epoxy resin may have a molecular weight of from 1000 to 50,000.

The epoxy resin may have a softening point (Tg) of from 70 to 120° C.

In the epoxy resin, the content of the solid may be from 10 to 50 wt %.

The content of the inorganic additive may be from 1 to 50 wt % for 100 wt % of the non-oriented electrical steel sheet composition.

The non-oriented electrical steel sheet composition may include an inorganic additive of phosphoric acid ($H_3PO_4$) or sodium hydroxide (NaOH), and the content of the inorganic additive may be from 3 to 50 wt % of phosphoric acid or from 1 to 10 wt % of sodium hydroxide for 100 wt % of the non-oriented electrical steel sheet composition.

In another exemplary embodiment of the present invention, a manufacturing method of a non-oriented electrical steel sheet product provides preparing a non-oriented electrical steel sheet composition including a first composition including a soluble epoxy resin and inorganic nanoparticles of $SiO_2$, $TiO_2$, ZnO, or combinations thereof, and an inorganic additive of phosphoric acid ($H_3PO_4$), sodium hydroxide (NaOH), or a combination thereof; coating the non-oriented electrical steel sheet composition on one surface or both surfaces of the non-oriented electrical steel sheet; hardening the coated non-oriented electrical steel sheet composition to form a coating layer; and stacking and heat-bonding another non-oriented electrical steel sheet on the coating layer.

The hardening of the non-oriented electrical steel sheet composition to form the coating layer may be executed at a temperature from 200 to 600° C.

The hardening of the non-oriented electrical steel sheet composition to form the coating layer may be executed for 5 to 40 s.

In the hardening of the non-oriented electrical steel sheet composition to form the coating layer, a thickness of the coating layer may be from 0.5 to 10 μm.

The stacking and heat-bonding of another non-oriented electrical steel sheet on the coating layer may be performed at a pressure of from 1 to 1000 N.

The stacking and heat-bonding of another non-oriented electrical steel sheet on the coating layer may be performed at a temperature from 120 to 300° C.

The stacking and heat-bonding of another non-oriented electrical steel sheet on the coating layer may be performed for 5 to 180 min.

In the hardening of the coated non-oriented electrical steel sheet composition to form the coating layer, a ratio of the inorganic material in the coating layer may be from 0.05 to 0.6 wt %.

The inorganic nanoparticle may be substituted in a terminal substituent group of the soluble epoxy resin, and the epoxy resin may be a multifunctional epoxy resin in which there are three or more epoxy groups.

In another exemplary embodiment of the present invention, a non-oriented electrical steel sheet product including a plurality of non-oriented electrical steel sheets, and an insulating layer positioned between the plurality of non-oriented electrical steel sheets is provided, wherein the insulating layer includes a first composition including a soluble epoxy resin and an inorganic nanoparticle of $SiO_2$, $TiO_2$, ZnO, or combinations thereof; and an inorganic additive of phosphoric acid ($H_3PO_4$), sodium hydroxide (NaOH), or a combination thereof, wherein the inorganic nanoparticle is substituted in a terminal substituent group of the soluble epoxy resin, and the epoxy resin is a multifunctional epoxy resin in which there are three or more epoxy groups.

The inorganic nanoparticle is substituted in the thermoplastic adhesive resin (e.g., epoxy resin) and the inorganic material is dissolved therein, thereby manufacturing the composition having the excellent high temperature adhesive property and the high temperature resistance oil property, and the non-oriented electrical steel sheet product including the same.

Accordingly, by omitting a conventional coupling method (e.g., welding, clamping, interlocking, aluminum die casting, or riveting), not only may the efficiency of the driving motor be improved, but also vibration and noise of the conventional motor may be improved.

DETAILED DESCRIPTION OF THE EMBODIMENTS

Hereinafter, exemplary embodiments of the present invention will be described. The exemplary embodiments, however, are provided as examples, and the present invention is not limited thereto, but is defined within the range of claims to be described below.

An exemplary embodiment of the present invention provides a non-oriented electrical steel sheet composition including a first composition including a soluble epoxy resin and an inorganic nanoparticle of $SiO_2$, $TiO_2$, ZnO, or combinations thereof, and an inorganic additive of phosphoric acid ($H_3PO_4$), sodium hydroxide (NaOH), or combinations thereof, wherein the inorganic nanoparticle is substituted in a terminal substituent group of the soluble epoxy resin and the epoxy resin is a multifunctional epoxy resin in which there are three or more epoxy groups.

For the composition according to an exemplary embodiment of the present invention, when forming a layer made of the composition, the layer has excellent oil resistant property, close contacting property, anti-corrosive property, insulating property, adherence between sheet cores, scratch resistance property, weatherability property, welding property, and/or high temperature oil resistant property.

The inorganic nanoparticle may be substituted in the terminal substituent group of the soluble epoxy resin, and the epoxy resin may have a molecular weight of 1000 to 50,000.

In relation of the range of the molecular weight, when the epoxy molecular weight is less than 1000, a hardening property may be decreased, and physical properties such as strength may be deteriorated. When the molecular weight of the epoxy resin is over 50,000, phase separation may be generated in the epoxy resin, and compatibility with the inorganic nanoparticle may be deteriorated.

In detail, the epoxy resin may have a molecular weight of 5000 to 30,000.

The epoxy resin may have a softening point (Tg) of 70 to 120° C., and a solid fraction (the content of the solid) may be 10 to 50 wt %.

The epoxy resin consists of a combination type of bisphenol and epoxide, however a part of a structural formula may be substituted into a polar group in order to be present in an aqueous dispersion state, thereby having a stable state without the phase separation such as precipitation in the aqueous dispersion state. In detail, the molecular weight of the epoxy resin is controlled while changing a ratio of bisphenol A (BPA) and epichlorohydrin (ECH) to improve a heat-resistant adhesive property, and there may be three or more multifunctional epoxy groups.

In the above-described thermoplastic resin, to ensure the high temperature adhesive property and the high temperature oil resistant property, the inorganic nanoparticle of a colloidal state is substituted in the thermoplastic resin to be modified into an organic/inorganic complex composition shape.

The inorganic nanoparticle of the colloidal state may be $SiO_2$, $TiO_2$, ZnO, or combinations thereof. The particle size of the inorganic nanoparticle may be 3 to 100 nm.

The particle size of the inorganic nanoparticle may be 3 to 50 nm for the $SiO_2$, 20 to 100 nm for the $TiO_2$, or 30 to 100 nm for the ZnO (in detail, 10 to 60 nm for the ZnO) may be provided. When the range is satisfied, a weak boundary layer may occur as time, cost, and size of the particles may be advantageously minimized.

Further, the content of the inorganic nanoparticles in the first composition may be 1 to 60 wt % for 100 wt % of the first composition. In detail, in the content of 100 wt % of the inorganic nanoparticles for the first composition, there may be 1 to 40 wt % of $SiO_2$, 5 to 30 wt % of $TiO_2$, or 3 to 60 wt % of ZnO (in detail, 20 to 60 wt % of ZnO). When the range is satisfied, the balance of the thermal resistance property and/or the adhesive property may be maintained.

To maximize the high temperature adhesive property and the high temperature oil resistant property of the resin composition modified into the above-described organic/inorganic complex composition, the inorganic additive having solubility may be dissolved in the composition.

The inorganic additive may be phosphoric acid ($H_3PO_4$), sodium hydroxide (NaOH), or combinations thereof.

In detail, the content of the inorganic additive may be 1 to 50 wt % for 100 wt % of the non-oriented electrical steel sheet composition. In detail, for example, in the content of the inorganic additive, for 100 wt % of the non-oriented electrical steel sheet composition, it may be 3 to 50 wt % of phosphoric acid or 1 to 10 wt % of sodium hydroxide. When the range is satisfied, it may be advantageous in terms of the precipitation problem of the inorganic additive, the thermal resistance property, and/or the oil resistant property.

In the composition according to an exemplary embodiment of the present invention, the solution stability, the coating workability, and the like are not only excellent, but also the surface characteristics (e.g., the anti-corrosive property, the insulating property, the close contacting property, and the like) may be improved when being formed as the film, and the high temperature adhesive property and the high temperature oil resistant property may be improved.

In another exemplary embodiment of the present invention, a manufacturing method of a non-oriented electrical steel sheet product includes: providing a non-oriented electrical steel sheet composition including a first composition including a soluble epoxy resin and an inorganic nanoparticle of $SiO_2$, $TiO_2$, or ZnO, or combinations thereof, and an inorganic additive of phosphoric acid ($H_3PO_4$), sodium hydroxide (NaOH), or combinations thereof; coating the non-oriented electrical steel sheet composition on one surface or both surfaces of the non-oriented electrical steel sheet; hardening the coated non-oriented electrical steel sheet composition to form a coating layer; and depositing another non-oriented electrical steel sheet to be thermal-bonded on the coating layer.

The non-oriented electrical steel sheet composition is the same as in the previous exemplary embodiment of the present invention such that the description thereof is omitted.

The hardening of the non-oriented electrical steel sheet composition to form the coating layer may be executed at a temperature of 200 to 600° C.

In detail, the hardening of the non-oriented electrical steel sheet composition to form the coating layer may be executed for 5 to 40 s.

In further detail, in the hardening of the non-oriented electrical steel sheet composition to form the coating layer, the thickness of the coating layer may be 0.5 to 10 μm.

When the ranges are satisfied, the excellent surface characteristics (e.g., the insulating property, the anti-corrosive property, the close contacting property, and the like) of the coating layer may be realized.

Also, the depositing of another non-oriented electrical steel sheet on the coating layer to be thermal-bonded may be executed at a pressure of 1 to 1000 N.

In detail, the depositing of another non-oriented electrical steel sheet on the coating layer to be thermal-bonded may be executed at 120 to 300° C.

In further detail, the depositing of another non-oriented electrical steel sheet on the coating layer to be thermal-bonded may be executed for 5 to 180 min.

When the ranges are satisfied, the thermal resistance property may be improved by the uniform distribution of the inorganic nanoparticles and/or the inorganic additive in the coating layer, and the high temperature adherence and the high temperature (about 150° C.) oil resistant property of the interlayer may be improved.

In the hardening of the non-oriented electrical steel sheet composition to form the coating layer, the ratio of the inorganic material in the coating layer may be 0.05 to 0.6 wt %. In this case, the required thermal resistance property and/or oil resistant property may be obtained.

Another exemplary embodiment of the present invention provides a non-oriented electrical steel sheet product including: a plurality of non-oriented electrical steel sheets; an insulating layer positioned between the plurality of non-oriented electrical steel sheets, wherein the insulating layer includes a first composition including a soluble epoxy resin and an inorganic nanoparticle such as $SiO_2$, $TiO_2$, ZnO, or combinations thereof; and an inorganic additive of phosphoric acid ($H_3PO_4$), sodium hydroxide (NaOH), or combinations thereof, wherein the inorganic nanoparticle is substituted in a terminal substituent group of the soluble epoxy resin, and the epoxy resin is a multifunctional epoxy resin in which there are three or more epoxy groups.

Exemplary Embodiment 1

Figure 1:
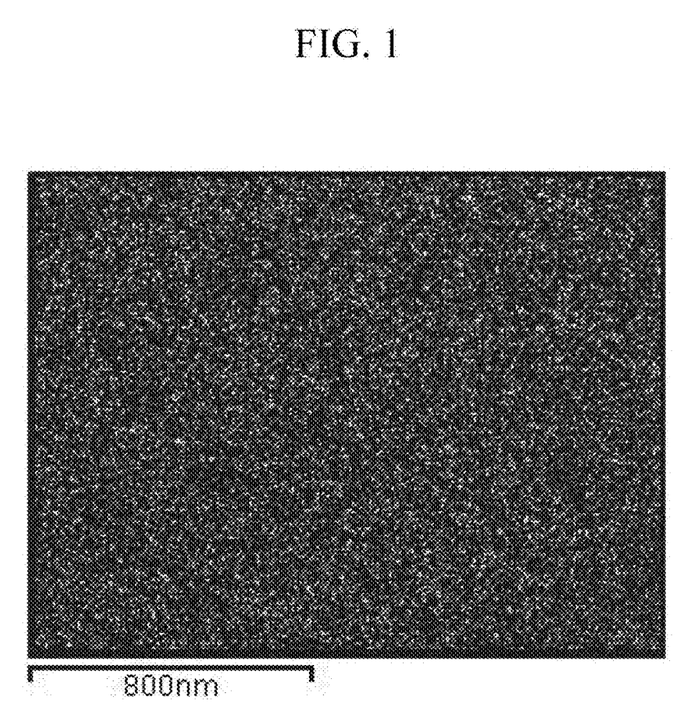
FIG. 1 is a cross-sectional TEM view of a coating layer according to Exemplary Embodiment 1 after a process by a FIB (focus ion beam).

FIG. 1 is a cross-sectional TEM view of a coating layer according to Exemplary Embodiment 1 after a process by a FIB (focus ion beam). FIG. 1 provides the non-oriented electrical steel sheet composition as described below.

Phosphoric acid ($H_3PO_4$) and sodium hydroxide (NaOH) are dissolved in an epoxy-$SiO_2$-based organic/inorganic complex composite. The molecular weight of the used epoxy adhesive resin is about 20,000, $SiO_2$ is substituted in the epoxy adhesive resin, the particle size is about 10 nm, and the content of the particles is 10 wt %. Phosphoric acid ($H_3PO_4$) and sodium hydroxide (NaOH) that are dissolved are respectively present at 3 wt % and 5 wt % for 100 wt % of the epoxy-$SiO_2$-based organic/inorganic complex composite.

A non-oriented electrical steel sheet (at 50×50 mm) is provided as an empty specimen, the above-described composition is coated on empty specimen with a predetermined thickness of about 5.0 μm, and then the coated non-oriented electrical steel sheet composition is hardened for 15 s at a temperature of 500° C.

As shown in FIG. 1, the inorganic nanoparticles are uniformly distributed in the coating layer, and it may be confirmed that the inorganic nanoparticles are uniformly distributed throughout the coating layer in the coating layer without cohesion or aggregation.

Figure 2:
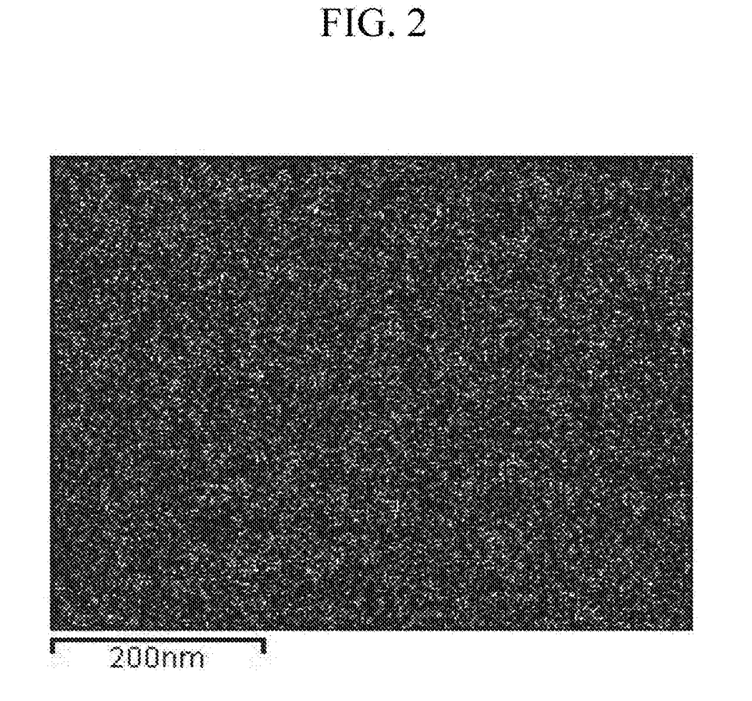
FIG. 2 is a TEM view showing a distribution of an inorganic additive dissolved in the coating layer according to Exemplary Embodiment 1.

FIG. 2 is a TEM photo showing a distribution of an inorganic additive dissolved in the coating layer according to Exemplary Embodiment 1. It may be confirmed that the components (Na, P) included in the inorganic material are also uniformly distributed in the coating layer.

The uniform distribution in the above-described coating layer of the inorganic nanoparticles and the inorganic additive improves the heat resistance of the adhesive resin, and accordingly, the high temperature adherence of the adhesion solution may satisfy the above level required by the driving motor of an environmentally-friendly automobile (HEV or EV).

Exemplary Embodiment 2

As shown in Table 1 below, the surface state, the room temperature adherence, and the high temperature adherence are measured after the coating depending on the molecular weight before the inorganic nanoparticles are substituted in the organic/inorganic complex non-oriented electrical steel sheet composition.

TABLE 1

|  | Molecular weight | Surface state | Room temperature adherence | High temperature adherence |
|---|---|---|---|---|
| Epoxy resin | ≈500 | ∟ | x | x |
|  | ≈1000 | ∟ | Δ | x |
|  | ≈5000 | | | ○ | x |
|  | ≈30,000 | ∟ | ∟ | x |
|  | ≈50,000 | ○ | ∟ | Δ |
|  | ≈70,000 | x | ∟ | Δ |

[property determination: excellent: ∟, superior: ○, usual: Δ, inferior: x]

The composition prepared in Table 1 is coated with the thickness of about 5 μm on both surfaces of the non-oriented electrical steel sheet by using a bar coater, is hardened at a drying temperature of 600° C. for 15 s, and is slowly cooled to room temperature.

The coated specimen is cut to a predetermined size (50 mm×50 mm), is stacked to a height of 30 mm, and the thermal bonding temperature of 200° C. and the time of 30 min are maintained under the pressure of 200 N.

The adherence is measured for the sample that is thermal-bonded in the above conditions by using a tension measuring apparatus. The used tension measuring apparatus is an apparatus for measuring the tension force at room temperature and the high temperature after thermal-bonding and fixing the prepared sample by a jig.

In this case, an interface having the minimum adherence is detached among the interfaces of the stacked sample in the measured value. In the above-described conditions, the same experiment is also repeated at room temperature to determine the degree of adherence.

As shown in Table 1, a trend that defects such as spots and stripes are generated appears in the surface of the coated coating layer as the molecular weight is increased, and the adherence is generally increased as the molecular weight of the adhesive resin is increased. The high temperature adherence at 150° C. is inferior and the adherence is more inferior when the molecular weight is low.

In Table 2, the stability, the room temperature/high temperature adherence, and the high temperature oil resistant property of the composition are measured depending on the kind, the size, and the substituted amount of the inorganic nanoparticles that are substituted in the epoxy-based organic/inorganic complex composition solution.

TABLE 2

|  | Epoxy-based organic/inorganic complex composition | | | Solution and adhesive characteristic | | | |
|---|---|---|---|---|---|---|---|
|  | Adhesive resin kind | Particle kind and size (nm) | Substituted amount (wt %) | Solution stability | Room temperature adherence 25° C. | High temperature adherence 150° C. | High temperature oil resistant property |
| Comparative Example | Epoxy adhesive resin (molecular weight ≈ 30,000) | | | ∟ | ∟ | X | X |
| Exemplary embodiment | Epoxy adhesive resin (molecular weight ≈ 30,000) | SiO₂ (3 nm) | 3 | ∟ | ∟ | Δ | Δ |
|  |  |  | 20 | ∟ | ∟ | Δ | Δ |
|  |  |  | 40 | ∟ | ○ | ○ | Δ |
|  |  | SiO₂ 25 nm | 3 | ∟ | ∟ | Δ | ○ |
|  |  |  | 20 | ∟ | ∟ | Δ | Δ |
|  |  |  | 40 | ○ | ○ | ○ | X |
|  |  | SiO₂ 50 nm | 3 | ○ | ○ | Δ | Δ |
|  |  |  | 20 | ○ | Δ | ○ | Δ |
|  |  |  | 40 | ○ | Δ | ○ | X |
|  |  | TiO₂ 20 nm | 5 | ∟ | ∟ | Δ | ○ |
|  |  |  | 15 | ∟ | ∟ | ○ | Δ |
|  |  |  | 30 | ○ | ○ | ○ | Δ |
|  |  | TiO₂ 50 nm | 5 | | | ○ | Δ | Δ |
|  |  |  | 15 | ○ | ○ | ○ | X |
|  |  |  | 30 | ○ | Δ | X | X |
|  |  | TiO₂ 100 nm | 5 | ○ | Δ | Δ | ○ |
|  |  |  | 15 | ○ | Δ | Δ | Δ |
|  |  |  | 30 | ○ | Δ | X | X |

TABLE 2-continued

| Epoxy-based organic/inorganic complex composition | | | Solution and adhesive characteristic | | | |
|---|---|---|---|---|---|---|
| Adhesive resin kind | Particle kind and size (nm) | Substituted amount (wt %) | Solution stability | Room temperature adherence 25° C. | High temperature adherence 150° C. | High temperature oil resistant property |
| | ZnO 10 nm | 3 | ⎿ | ⎿ | ○ | ○ |
| | | 30 | ○ | ○ | ○ | Δ |
| | | 60 | ○ | ○ | Δ | Δ |
| | ZnO 30 nm | 3 | ⎿ | ⎿ | ○ | Δ |
| | | 30 | ○ | ○ | X | X |
| | | 60 | ○ | Δ | X | X |
| | ZnO 60 nm | 3 | ⎿ | Δ | X | X |
| | | 30 | ○ | Δ | X | X |
| | | 60 | ○ | Δ | X | X |

[property determination: excellent: ⎿, superior: ○, usual: Δ, inferior: x]

The soluble epoxy adhesive resin having the molecular weight of less than about 30,000 is used as a comparative example, and in the case of the 100% epoxy adhesive resin, it may be confirmed that the stability of the adhesive solution and the room temperature adherence are excellent, however the high temperature adherence and the high temperature oil resistant property are very inferior.

To overcome the limitation of the inferiority of the high temperature adhesive property and the high temperature oil resistant property of the epoxy adhesive resin, the exemplary embodiment of the present invention provides the adhesive solution of the composition form in which the inorganic nanoparticles of the colloidal state are substituted.

As shown in Table 2, in the case of the epoxy-SiO$_2$-based composition, the solution stability and the room temperature adherence are excellent regardless of the size and the substituted amount of the inorganic nanoparticles, however the trend that the high temperature adherence becomes inferior appears as the size of the inorganic nanoparticles is increased and/or the substituted amount of SiO$_2$ is increased.

Also, the high temperature oil resistant property overall is inferior, and particularly as the size of the inorganic nanoparticles is increased and/or as the substituted amount of the inorganic nanoparticle is increased, the trend of the serious inferiority further appears.

This seems to be because the weak boundary layer is formed by the relatively large particle size in the boundary surface between the specimen and the specimen as the size of the inorganic nanoparticles is increased such that the oil penetrates the interface through the weak boundary layer at the high temperature (about 150 to 170° C.), thereby deteriorating the adhesive property at the interfaces.

The solution stability and the room temperature adherence are somewhat inferior in the epoxy-TiO$_2$-based composition and the epoxy-ZnO-based composition compared with the epoxy-SiO$_2$-based composition, however excellent overall characteristics appear. However, the high temperature adherence and the high temperature oil resistant property have the further inferior trend because of the relatively large size of the inorganic nanoparticles and the large substituted amount compared with the epoxy-SiO$_2$-based composition.

Table 3 shows the result of estimating the characteristics after dissolving sodium hydroxide (NaOH) and/or phosphoric acid (H$_3$PO$_4$) at a predetermined amount in the composition to maximize the high temperature adhesive property and the high temperature oil resistant property of the organic/inorganic complex composition of three kinds (the epoxy-SiO$_2$ based, the epoxy-TiO$_2$-based, and the epoxy-ZnO-based compositions).

TABLE 3

| | Organic/inorganic complex composition | | | Solution and adhesive characteristic | | | |
|---|---|---|---|---|---|---|---|
| | | Inorganic material kind | Dissolved amount | Solution stability | Room temperature adherence 25° C. | High temperature adherence 150° C. | High temperature oil resistant property |
| Exemplary embodiment | Epoxy (molecular weight ≈ 30,000)-SiO$_2$ (25 nm, 20 wt %) Composite | NaOH | 1 | ⎿ | ⎿ | ○ | ○ |
| | | | 5 | ⎿ | ⎿ | ○ | ○ |
| | | | 10 | ○ | ○ | ⎿ | ⎿ |
| | | | 15 | Δ | Δ | Δ | Δ |
| | | H$_3$PO$_4$ | 1 | ⎿ | ⎿ | ○ | ○ |
| | | | 30 | ⎿ | ○ | ○ | ○ |

TABLE 3-continued

| | | | Solution and adhesive characteristic | | | |
|---|---|---|---|---|---|---|
| Organic/inorganic complex composition | | | | Room | High | High temperature |
| Inorganic material kind | Dissolved amount | Solution stability | temperature adherence 25° C. | temperature adherence 150° C. | oil resistant property |
| | | 50 | ○ | ○ | ○ | ○ |
| | | 70 | Δ | Δ | Δ | Δ |
| Epoxy (molecular weight ≈ 30,000)-TiO₂ (20 nm, 15 wt %) Composite | NaOH | 1 | ⌊ | ⌊ | ○ | ○ |
| | | 5 | ⌊ | ⌊ | ○ | ○ |
| | | 10 | ○ | ⌊ | ⌊ | ⌊ |
| | | 15 | Δ | Δ | Δ | Δ |
| | H₃PO₄ | 1 | ⌊ | ⌊ | ○ | ○ |
| | | 30 | ⌊ | ○ | ○ | ○ |
| | | 50 | ○ | ○ | ○ | ○ |
| | | 70 | Δ | Δ | Δ | Δ |
| Epoxy (molecular weight ≈ 50,000)-ZnO (10 nm, 30 wt %) Composite | NaOH | 1 | ○ | ⌊ | Δ | Δ |
| | | 5 | ○ | ⌊ | ⌊ | ⌊ |
| | | 10 | ○ | ○ | ○ | ○ |
| | | 15 | Δ | Δ | Δ | Δ |
| | H₃PO₄ | 1 | ○ | ⌊ | Δ | Δ |
| | | 30 | ○ | ○ | ⌊ | ⌊ |
| | | 50 | ○ | ○ | ○ | ○ |
| | | 70 | Δ | Δ | Δ | Δ |

[property determination: excellent: ⌊, superior: ○, usual: Δ, inferior: x]

Sodium hydroxide (NaOH) or phosphoric acid (H₃PO₄) is added to the composition according to Table 2 by each content of Table 3 compared with 100 wt % of the entire composition.

The molecular weight of the used epoxy resin is about 30,000, the particle size of the SiO₂, TiO₂, and ZnO substituted in the epoxy resin is 25 nm, 20 nm, and 10 nm, respectively, and the content of the particles is respectively 20 wt %, 15 wt %, and 30 wt % with respect to 100 wt % of the entire epoxy resin before adding the inorganic additive.

The base surface characteristics (the insulating property, the anti-corrosive property, the close contacting property, and the like) of the non-oriented electrical steel sheet after the coating are excellent, and the processing characteristics (a slitting property or a punching property) are also excellent.

As shown in Table 3, the trend that the solution stability becomes inferior appears as the solution amount of sodium hydroxide (NaOH) or phosphoric acid (H₃PO₄) is increased.

The room temperature adherence is excellent overall regardless of the kind and the size of the substituted inorganic particles, however the deterioration trend appears as the solution amount of sodium hydroxide (NaOH) or phosphoric acid (H₃PO₄) is increased. This is because the amount of the adhesive resin in the coating layer is relatively small compared with the inorganic nanoparticles and the inorganic additive.

The high temperature adherence and the high temperature oil resistant property show the similar characteristic, and in the case of the epoxy-SiO₂-based composition, when the dissolved amount of sodium hydroxide (NaOH) or phosphoric acid (H₃PO₄) is 1 to 15 wt %, the two characteristics are excellent.

Likewise, in the case of the epoxy-TiO₂-based composition and the epoxy-ZnO-based composition, when the dissolved amount of sodium hydroxide (NaOH) or phosphoric acid (H₃PO₄) has the appropriate degree, the two characteristics are excellent. This means that the size and the amount of the substituted inorganic nanoparticles is related as well as the dissolved sodium hydroxide (NaOH) or phosphoric acid (H₃PO₄).

In general, if the amount of the entire substituted and dissolved inorganic materials (the inorganic nanoparticles and the inorganic additive) is very small, the ratio of the adhesive resin included in the solution is relatively small, and the heat resistance is inferior such that the high temperature adherence and the high temperature oil resistant property may be deteriorated.

In contrast, if the amount of the inorganic materials (the inorganic nanoparticles and the inorganic additive) is very large, the heat resistance property is excellent because of the inorganic materials, and the ratio of the adhesive resin included in the solution is relatively low such that the high temperature adherence and the high temperature oil resistant property may be deteriorated.

It may be appropriate when the content of the inorganic material in the entire composition is 0.05 to 0.6 wt %. However, it is not limited thereto.

For solution stability, after strongly stirring the organic/inorganic complex composition in which the inorganic nanoparticles are substituted or the organic/inorganic complex composition in which the inorganic additive is dissolved by an agitator for 30 min, the mixed solution is maintained for 30 min. Whether precipitation or a gel status is generated in the film composition is determined.

For the room temperature and high temperature adherence, after stacking samples that are coated with the predetermined thickness for each surface, the heat bonding is executed under the predetermined condition and the measuring is executed by the adherence measuring apparatus at room temperature and a high temperature 150° C. In the measured value at room temperature, it is represented that the adherence is excellent when the adherence is more than 2.0 MPa, it is superior when it is more than 1.0 MPa, it is usual when it is more than 0.5 MPa, and it is inferior when it is less than 0.5 MPa. In contrast, at the high temperature, it is represented that the adherence is excellent when more than 1.0 MPa, it is superior when more than 0.5 MPa, it is usual when more than 0.3 MPa, and it is inferior when less than 0.3 MPa.

For the high temperature oil resistant property, the heat bonded sample is maintained for 3 h in ATF (Automatic Transmission Fluid) oil at a high temperature of 170° C. and is slowly cooled to measure the surface state and the adherence at room temperature. When observing the surface state, the oil must not penetrate into the interface between the sheet cores, or the adhesive coating layer must not be melted by the ATF oil. As a determining reference of the oil resistant property, it is represented that it is excellent when the adherence of the sample through the high temperature ATF experiment is more than 1.0 MPa, it is superior when more than 0.5 MPa, it is usual when more than 0.3 MPa, and it is inferior when less than 0.3 MPa.

The present invention is not limited to the aforementioned exemplary embodiments, but may be manufactured in various different forms, and it will be apparent to those skilled in the art that various modifications and changes may be made thereto without departing from the scope and spirit of the invention. Therefore, it should be understood that the above exemplary embodiments are not limitative, but are illustrative in all aspects.

What is claimed is:

1. A non-oriented electrical steel sheet adhesive coating composition comprising:
   a first composition including an epoxy resin and an inorganic nanoparticle of $SiO_2$, $TiO_2$, ZnO, or combinations thereof; and
   an inorganic additive of sodium hydroxide (NaOH),
   wherein the inorganic nanoparticle is substituted in a terminal substituent group of the epoxy resin,
   the epoxy resin is a multifunctional epoxy resin in which there are three or more epoxy groups, and
   wherein the content of the inorganic additive is from 1 to 10 wt % of sodium hydroxide with respect to 100 wt % of the non-oriented electrical steel sheet adhesive coating composition.

2. The non-oriented electrical steel sheet adhesive coating composition of claim 1, wherein
   the content of the inorganic nanoparticle in the first composition is from 1 to 60 wt % for 100 wt % of the first composition.

3. The non-oriented electrical steel sheet adhesive coating composition of claim 1, wherein
   the first composition includes epoxy resin and an inorganic nanoparticle of $SiO_2$, $TiO_2$, or ZnO, and
   the content of the inorganic nanoparticle is from 1 to 40 wt % of $SiO_2$, from 5 to 30 wt % of $TiO_2$, or from 3 to 60 wt % of ZnO for 100 wt % of the first composition.

4. The non-oriented electrical steel sheet adhesive coating composition of claim 1, wherein
   the first composition includes epoxy resin and an inorganic nanoparticle of $SiO_2$, $TiO_2$, or ZnO, and
   the particle size of the inorganic nanoparticle is from 3 to 50 nm for $SiO_2$, from 20 to 100 nm for $TiO_2$, or from 30 to 100 nm for ZnO.

5. The non-oriented electrical steel sheet adhesive coating composition of claim 1, wherein
   the epoxy resin has a softening point (Tg) of from 70 to 12° C.

6. The non-oriented electrical steel sheet adhesive coating composition of claim 1, wherein in the epoxy resin, a solid fraction is from 10 to 50 wt %.

7. The non-oriented electrical steel sheet adhesive coating composition of claim 1, wherein
   the non-oriented electrical steel sheet composition further includes an inorganic additive of phosphoric acid ($H_3PO_4$), and
   the content of the inorganic additive is from 3 to 50 wt % of phosphoric acid with respect to 100 wt % of the non-oriented electrical steel sheet composition.

8. The non-oriented electrical steel sheet adhesive coating composition of claim 1, wherein
   the non-oriented electrical steel sheet composition includes both phosphoric acid ($H_3PO_4$) and sodium hydroxide (NaOH), and
   the epoxy resin has a softening point (Tg) of from 70 to 120° C.

9. A method for manufacturing a non-oriented electrical steel sheet product, comprising:
   preparing a non-oriented electrical steel sheet composition including a first composition according to claim 1;
   coating the non-oriented electrical steel sheet composition on one surface or both surfaces of the non-oriented electrical steel sheet;
   hardening the coated non-oriented electrical steel sheet composition to form a coating layer; and
   stacking and heat-bonding another non-oriented electrical steel sheet on the coating layer.

10. The method of claim 9, wherein
    the hardening of the non-oriented electrical steel sheet composition to form the coating layer is executed at a temperature from 200 to 600° C.

11. The method of claim 9, wherein
    the hardening of the non-oriented electrical steel sheet composition to form the coating layer is executed for 5 to 40 s.

12. The method of claim 9, wherein
    in the hardening of the non-oriented electrical steel sheet composition to form the coating layer, a thickness of the coating layer is from 0.5 to 10 µm.

13. The method of claim 9, wherein
    the stacking and heat-bonding of another non-oriented electrical steel sheet on the coating layer is performed at a pressure of from 1 to 1000 N.

14. The method of claim 9, wherein
    the stacking and heat-bonding of another non-oriented electrical steel sheet on the coating layer is performed at a temperature from 120 to 300° C.

15. The method of claim 9, wherein
    the stacking and heat-bonding of another non-oriented electrical steel sheet on the coating layer is performed for 5 to 180 min.

16. The method of claim 9, wherein
in the hardening of the coated non-oriented electrical steel sheet composition to form the coating layer, a ratio of the inorganic material in the coating layer is from 0.05 to 0.6 wt %.

17. A non-oriented electrical steel sheet product, comprising:
a plurality of non-oriented electrical steel sheets; and
an insulating layer positioned between the plurality of non-oriented electrical steel sheets,
wherein the insulating layer includes a composition according to claim 1, includes a first composition including a soluble epoxy resin and an inorganic nanoparticle of $SiO_2$, $TiO_2$, ZnO, or combinations thereof, and an inorganic additive of phosphoric acid ($H_3PO_4$), sodium hydroxide (NaOH), or a combination thereof, and
the inorganic nanoparticle is substituted in a terminal substituent group of the soluble epoxy resin, and the epoxy resin is a multifunctional epoxy resin in which there are three or more epoxy groups.

\* \* \* \* \*